Sept. 28, 1954   V. T. WIGLESWORTH   2,690,088
CLAMP
Filed April 4, 1951
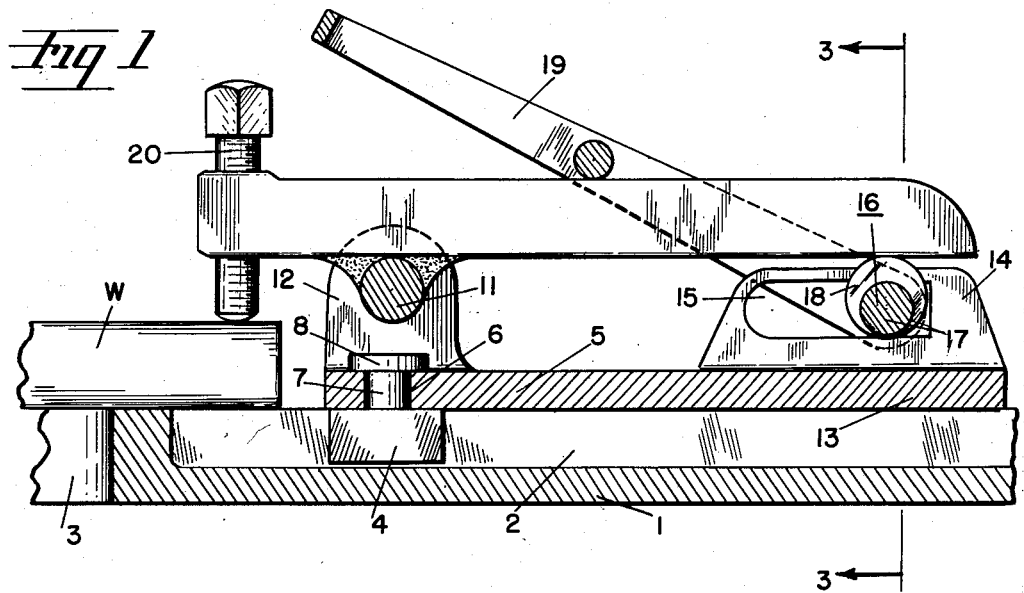
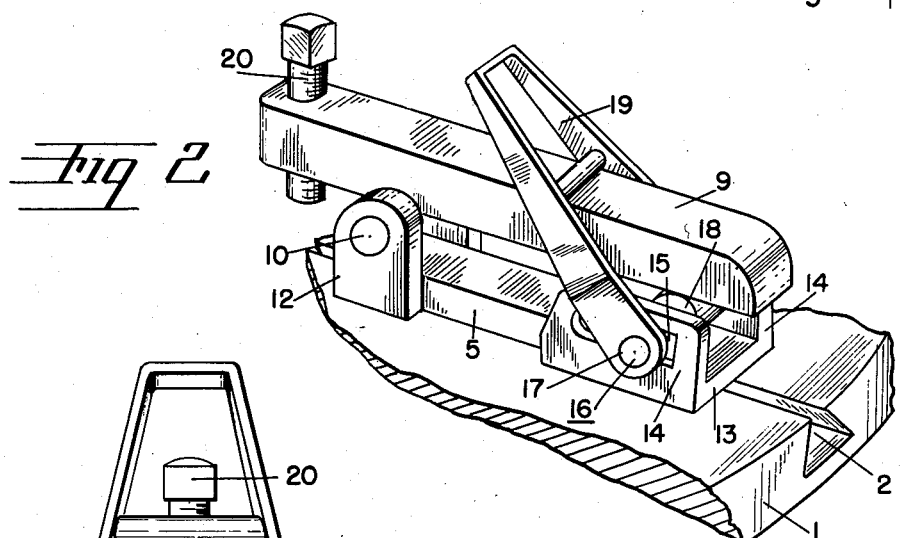
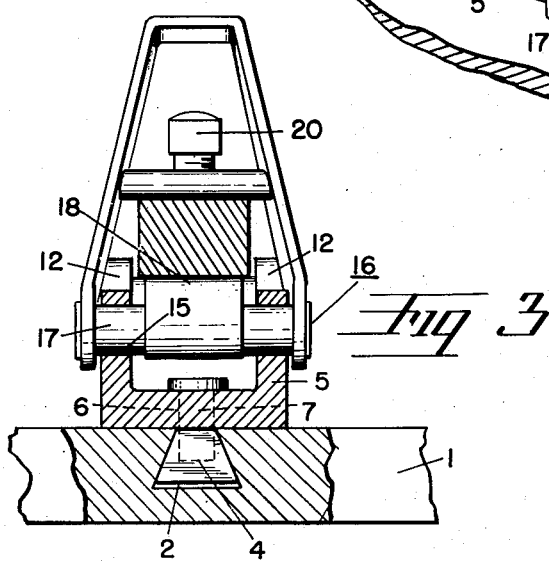
INVENTOR.
Victor T. Wiglesworth Patented Sept. 28, 1954

2,690,088

UNITED STATES PATENT OFFICE 2,690,088

CLAMP

Victor T. Wiglesworth, Portland, Oreg.

Application April 4, 1951, Serial No. 219,207

3 Claims. (Cl. 77—63)

This invention relates to clamps and is particularly adapted to be used in connection with power drill platforms for securely holding work thereto.

I have as the objects of my invention the following:

(a) The primary object of my invention is to so construct my clamp that various clamping pressures may be applied to the work and to accomplish the above object quickly.

(b) A further object of my invention is to provide a clamp that is adjusted upon the platform to work positioning on the platform.

(c) A still further object of my invention is to provide a clamp with a variable pressure adjustment.

Other objects of the present invention are described hereinafter.

Referring to the drawings:

Figure 1 is a side view partially in section, illustrating the clamp in clamping position.

Figure 2 is a perspective view of my clamp shown in position on a portion of the drill press platform.

Figure 3 is a section view taken on lines 3—3 of Figure 1 looking in the direction indicated on the drawings:

My new clamp is adapted to be used in connection with machinery where a platform is used for maintaining a clamping tool as in power drills, more commonly known as drill presses, gang drills, reamers, etc.

I illustrate in the drawings a platform 1 provided with radial taper spline ways 2; the platform is usually circular in design and has a 6 drill receiving hole 3 in center as illustrated in Fig. 1.

My clamp consists of a taper spline plug 4, pivotally mounted to a base assembly 5 at 6 by a pin 7. The pin 7, is fastened on its one end to the taper spline plug 4 and a substantial shoulder 8 is formed on its other. This construction allows the base assembly 5 to be rotated radially around the pin 7, its purpose will be described later.

To the base 5, I pivotally mount a pressure bar 9, as shown at 10, comprising a shaft 11 welded or otherwise secured to the pressure bar 9, and extending through the tongues 12 which form part of the base 5 on its forward end.

To the opposite end 13 of the base assembly 5 a pair of opposite tongues 14, extend upward from the base 5, and slotways 15 are provided within the tongues to maintain a pressure actuating assembly indicated in general by the numeral 16. This assembly consists of a cross shaft 17 having a pressure cam 18 positioned centrally of the shaft and also being in registry with the pressure bar 9. A handle 19 is securely fastened to the outer ends of the shaft 17, extending upward and over the bar 9 as illustrated in Fig. 1 and Fig. 2.

Forward of the fulcrum shaft 11 a hold down screw 20 is threaded vertically through the bar 9 and being in registry with the work W as shown in Fig. 1.

Explaining the operations of my device.

I first place the clamp on the platform 1 by inserting the spline plug 4, into the splineway 2. This secures the clamp to the platform except for slidable adjustment within the splineway. The clamp being movable radially is then adjusted to the most suitable position in registry with the work W; as shown in Fig. 1 the handle is rotated clockwise to bring the lowest part of the cam 18 in registry with the bar 9; the hold down screw 20 is then rotated to come in contact with the work W. The handle 19 is then moved counter-clockwise to the position shown in Fig. 1.

The amount of pressure applied to the work W is determined by the mechanical advantage of the lever construction as 2 to 1–3 to 1, etc. plus the rise of the cam peak, plus the length of the handle.

It is readily seen that many leverage ratios may be provided in manufacture.

It will be noted (Fig. 1) to provide for quick lever ratio change, the lever shaft 17 is slidable toward and away from the fulcrum shaft 11 thereby quickly changing the lever ratio and varying the applied pressure to the work through the screw 20.

I claim:

1. The combination in a clamping device of a base having a spline rotably mounted to said base, said spline being cooperant with splineways, a head member pivotably mounted to the base above the spline, a control screw positioned forward the head member pivot point, a cam member positioned between the base and the head member rearward the pivot point, a slotway to receive the camshaft allowing the camshaft movement toward and away from the head member pivot point, and a handle carried by the camshaft operable for rotable movement of the said cam.

2. The combination in a clamping device of a base, a spline rotably mounted to said base and cooperant to splineways, a head member pivotally mounted to base extensions above said spline pivot point, an adjustable screw control positioned forward the pivot point in said head member, a pair of slotways to receive a shaft, a cam forming part of the shaft between the slotways and bearing against the head member, and a handle forming part of the shaft for rotable movement of the shaft and longitudinal movement of the shaft within the slotways, the longitudinal movement of said shaft being toward and away from the head member pivot point respectively.

3. The combination in a clamping device of a base, a spline rotably mounted to the base and cooperant to splineways, a head member pivotally mounted to base extensions above said spline pivot point, an adjustable control screw positioned forward the pivot point and cooperant to work forces, a pair of elongated parallel slotways associated with the base, a cam member having shaft extensions riding within the slotways, said cam arranged to bear against the under-surface of the head member rearward of the pivot point, and an operating handle carried on the cam shafts for rotable and longitudinal movement thereof.

References Cited in the file of this patent

UNITED STATES PATENTS

| Number | Name | Date |
|---|---|---|
| 63,929 | Morse | Apr. 16, 1867 |
| 307,710 | Dubrul | Nov. 4, 1884 |
| 805,792 | Hadden | Nov. 28, 1905 |
| 1,060,477 | Meyers | Apr. 29, 1913 |